(12) United States Patent
Guen et al.

(10) Patent No.: US 11,196,127 B2
(45) Date of Patent: Dec. 7, 2021

(54) BATTERY MODULE

(71) Applicant: SAMSUNG SDI CO., LTD., Yongin-si (KR)

(72) Inventors: Minhyung Guen, Yongin-si (KR); Yongjin Park, Yongin-si (KR); Taeweon Heo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 225 days.

(21) Appl. No.: 16/416,643

(22) Filed: May 20, 2019

(65) Prior Publication Data

US 2019/0379023 A1 Dec. 12, 2019

(30) Foreign Application Priority Data

Jun. 12, 2018 (KR) .......................... 10-2018-0067516

(51) Int. Cl.
*H01M 2/20* (2006.01)
*H01M 50/502* (2021.01)

(52) U.S. Cl.
CPC ................................ *H01M 50/502* (2021.01)

(58) Field of Classification Search
None
See application file for complete search history.

(56) References Cited

U.S. PATENT DOCUMENTS

| | | | |
|---|---|---|---|
| 2003/0027044 A1* | 2/2003 | Asahina | H01M 50/528 429/179 |
| 2005/0250006 A1 | 11/2005 | Kim | |
| 2013/0260611 A1 | 10/2013 | Ahn | |
| 2015/0022949 A1 | 1/2015 | Vigneras | |
| 2015/0171404 A1 | 6/2015 | Kwon | |
| 2015/0221921 A1 | 8/2015 | Choi et al. | |
| 2016/0329543 A1 | 11/2016 | Zhang et al. | |
| 2016/0329544 A1 | 11/2016 | Zhang et al. | |
| 2016/0336564 A1 | 11/2016 | Lee | |
| 2018/0269456 A1 | 9/2018 | Idikurt et al. | |

FOREIGN PATENT DOCUMENTS

| | | |
|---|---|---|
| CN | 1694294 A | 11/2005 |
| CN | 103367686 A | 10/2013 |
| CN | 103827999 A | 5/2014 |

(Continued)

OTHER PUBLICATIONS

EPO Extended Search Report dated Oct. 23, 2019, for corresponding European Patent Application No. 19176973.6 (7 pages).

(Continued)

*Primary Examiner* — Haroon S. Sheikh
(74) *Attorney, Agent, or Firm* — Lewis Roca Rothgerber Christie LLP

(57) ABSTRACT

A battery module according to an embodiment of the present invention includes: a plurality of unit cells, each including a case and an electrode terminal protruding from the case; and a bus bar which electrically connects any pair of unit cells among the plurality of unit cells, and the bus bar includes: a terminal coupler which is inserted between respective electrode terminals of the pair of unit cells; and a case coupler which is inserted between respective cases of the pair of unit cells.

8 Claims, 3 Drawing Sheets

(56) References Cited

FOREIGN PATENT DOCUMENTS

| CN | 104821385 A | 8/2015 |
| CN | 107170943 A | 9/2017 |
| DE | 102016200961 A1 | 7/2017 |
| KR | 10-2015-0091791 A | 8/2015 |
| KR | 10-2017-0028647 A | 3/2017 |

OTHER PUBLICATIONS

EPO Office Action dated Sep. 9, 2020, issued in corresponding European Patent Application No. 19176973.6 (4 pages).
Office Action from corresponding European Patent Application No. 19176973.6, European Office Action dated Apr. 13, 2021 (4 pgs.).
Chinese Office Action, with English translation, dated Oct. 11, 2021, issued in corresponding Chinese Patent Application No. 201910423085.7 (15 pages).

* cited by examiner

BATTERY MODULE

CROSS-REFERENCE TO RELATED APPLICATION

This application claims priority to and the benefit of Korean Patent Application No. 10-2018-0067516 filed on Jun. 12, 2018 in the Korean Intellectual Property Office, the entire content of which is incorporated herein by reference.

BACKGROUND

1. Field

Aspects of embodiments of the present invention relate to a battery module.

2. Description of the Related Art

A rechargeable battery is a battery which repeatedly performs charge and discharge, different from a primary battery. A small-capacity rechargeable battery may be used in a portable small electronic device, such as a mobile phone, a notebook computer, or a camcorder, and a large-capacity rechargeable battery may be used as a power supply for driving a motor, such as for a hybrid vehicle or an electric vehicle.

The rechargeable battery may be used as a single cell, as in a small electronic device, or may be used in a module state in which a plurality of unit cells are electrically connected, as in the power supply for driving the motor. A battery module in which unit cells are used as rechargeable batteries and include a plurality of unit cells includes a bus bar which enables the plurality of unit cells to be electrically connected to one another.

The bus bar may be coupled to an electrode terminal of the unit cells, and may have any of various coupling methods. Resistance or the like may be different according to a coupling method or the like of the unit cells and the bus bar.

Further, when swelling occurs in the unit cells, a separation distance between electrode terminals which are each provided in a plurality of unit cells may vary. When the bus bar is coupled to the electrode terminals which are each provided in the plurality of unit cells, tension or the like may be formed in the bus bar according to a change in the separation distance such that damage to the bus bar may occur. Therefore, it is important to effectively cope with this.

The above information disclosed in this Background section is only for enhancement of understanding of the background of the invention and, therefore, it may contain information that does not form the prior art that is already known in this country to a person of ordinary skill in the art.

SUMMARY

According to an aspect of embodiments of the present invention, a battery module which connects a plurality of secondary unit cells, each including an electrode terminal, to a bus bar is provided. According to aspects of embodiments of the present invention, a battery module minimizes or reduces an additional configuration for coupling a bus bar, implements stable coupling of the bus bar, and can effectively respond to or accommodate swelling of the unit cells.

A battery module according to one or more embodiments of the present invention includes: a plurality of unit cells, each including a case and an electrode terminal protruding from the case; and a bus bar which electrically connects any pair of unit cells among the plurality of unit cells, wherein the bus bar includes: a terminal coupler which is inserted between respective electrode terminals of the pair of unit cells; and a case coupler which is inserted between respective cases of the pair of unit cells.

The electrode terminal and the case may have a same polarity.

The unit cells may be arranged along a width direction of the cases, the terminal coupler may be extended along an arrangement direction of the plurality of unit cells, and both end portions of the terminal coupler may in contact with respective electrode terminals of the pair of unit cells. The case coupler may be extended from the terminal coupler, and both surfaces of the case coupler may be in contact with respective cases of the pair of unit cells.

The electrode terminal may have an insertion groove in a surface thereof facing the terminal coupler such that the terminal coupler is inserted into and coupled to the insertion groove, a surface of the insertion groove at a longitudinal directional side of the case may be open, and the terminal coupler may be slidable along a longitudinal direction of the case such that the terminal coupler may be inserted into the insertion groove.

The case may have a stepped groove formed in a surface thereof facing the case coupler such that the case coupler is inserted into the stepped groove.

The case coupler may have an internal space to accommodate a separation distance change of the pair of unit cells.

The terminal coupler and the case coupler may be formed by bending a single conductive member, and both surfaces of the bus bar may be open along a longitudinal direction of the case.

The case coupler may be extended from the terminal coupler, and an end portion of the case coupler may be open such that the internal space is exposed to the outside.

The bus bar may include an insulating member having elasticity in the internal space of the case coupler.

According to aspects of embodiments of the present invention, a battery module can minimize or reduce additional configurations for coupling a bus bar, can implement stable coupling of the bus bar, and can effectively correspond to swelling of the unit cells.

DESCRIPTION OF SYMBOLS

Figure 1:
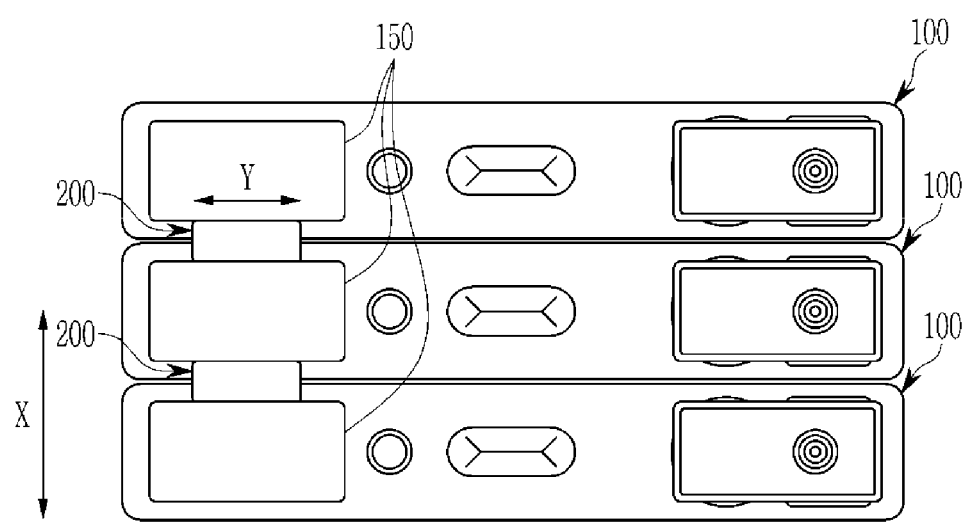
FIG. 1 is a top view showing a battery module according to an example embodiment of the present invention.

| | |
|---|---|
| 100: Unit cell | 110: Electrode assembly |
| 120: Case | 125: Stepped groove |
| 150: Electrode terminal | 155: Insertion groove |
| 200: Bus bar | 205: Internal space |
| 220: Terminal coupling unit | 240: Case coupling unit |
| 245: End portion | 250: Insulating member |

DETAILED DESCRIPTION

Herein, some embodiments of the present invention will be described in further detail with reference to the accompanying drawings such that the present invention can be easily realized by those skilled in the art.

However, the present invention can be implemented in various different forms and is not limited to the embodiments described herein. In the drawings, parts that are irrelevant to the description may be omitted for simplicity of explanation, and like reference numerals denote like parts throughout.

In the present specification, repeated descriptions of the same elements may be omitted.

Further, in the present specification, if it is described that an element is "coupled" or "connected" to another element, it is to be understood that the element may be directly coupled or connected to another element or one or more other elements may be interposed therebetween. On the contrary, in the present specification, if it is described that an element is "directly coupled" or "directly connected" to another element, it is to be understood that no other element is interposed therebetween.

Further, the terms used in the present specification are merely used to describe particular embodiments, and are not intended to limit the present invention.

In addition, an expression of the singular form in the present specification covers an expression in the plural form unless otherwise clearly indicated from the context.

In the present specification, it is to be understood that the term "include" or "has" indicates that a feature, a number, a step, an operation, a component, a part, or a combination thereof described in the specification is present, but does not exclude the possibility of the presence or addition of one or more other features, numbers, steps, operations, components, parts, or combinations thereof.

In the present specification, the term "and/or" includes a combination of multiple described items or any one of the multiple described items. In the present specification, "A or B" may include "A," "B," or "both A and B."

It is to be understood that, although the terms "first," "second," etc. may be used herein to describe various elements, these elements should not be limited by these terms. These terms are used to distinguish one element from another. For example, a first element could be termed a "second" element, and, similarly, a second element could be termed a "first" element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. However, the terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Figure 2:
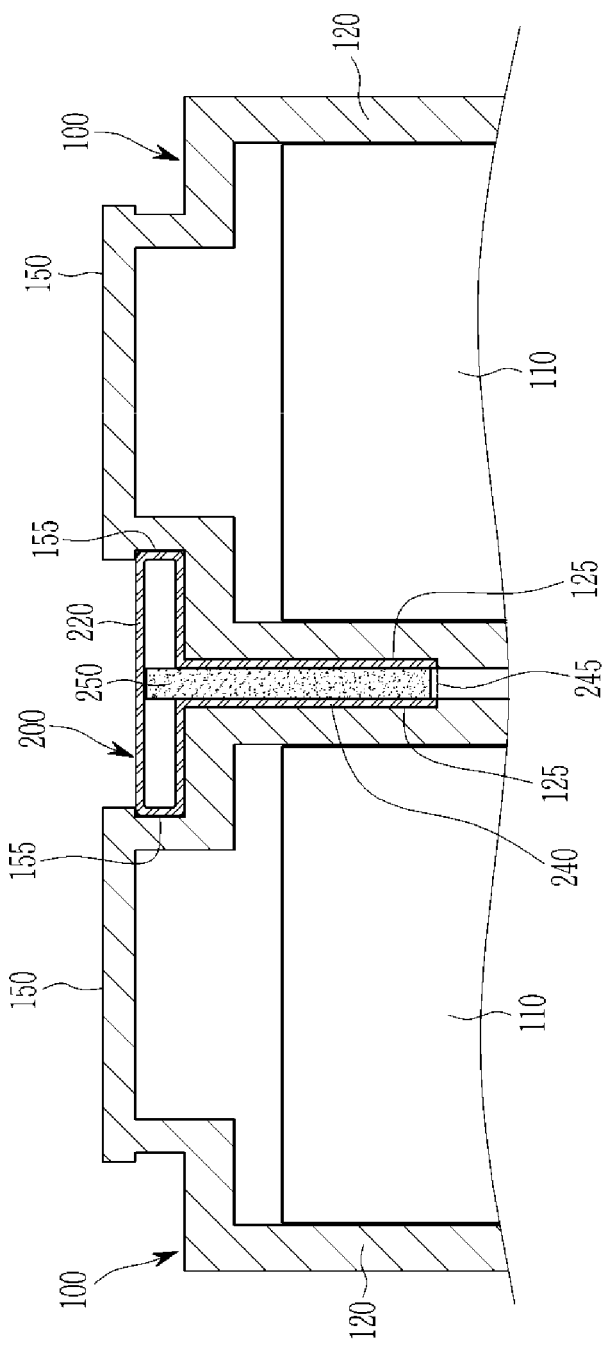
FIG. 2 is a side view showing a cross-section of a pair of unit cells and a bus bar in a battery module according to an example embodiment of the present invention.

A battery module in which a plurality of unit cells 100 are connected through a bus bar 200 according to an example embodiment of the present invention is illustrated in FIG. 1, and a cross-sectional view of the bus bar 200 which electrically connects a pair of unit cells 100 to each other according to an example embodiment of the present invention is illustrated in FIG. 2.

As illustrated in FIGS. 1 and 2, a battery module according to an example embodiment of the present invention includes: a plurality of unit cells 100, each including a case 120 and an electrode terminal 150 which is protruded from the case 120; and a bus bar 200 which electrically connects any pair of unit cells 100 among the plurality of unit cells 100.

Further, the bus bar 200 includes a terminal coupling unit, or terminal coupler, 220 which is inserted between respective electrode terminals 150 of the pair of unit cells 100, and a case coupling unit, or case coupler, 240 which is inserted between respective cases 120 of the pair of unit cells 100.

Although the unit cell 100 of the present invention may include any of various types of unit cells, the unit cell 100 may include a rechargeable battery which can be charged and discharged. The unit cell 100 includes the case 120, and an electrode assembly 110 including an anode, a cathode, and a separator may be accommodated within the case 120.

The electrode assembly 110 may be formed in a wound shape, a stacked shape, or the like, and the case 120 may be formed in any of various shapes as desired. The case 120 may have an open shape formed in a surface thereof to accommodate the electrode assembly 110, and a cap plate may be coupled to the open surface of the case 120.

The unit cell 100 includes electrode terminals 150 which are protruded from the case 120, and the electrode terminals 150 may be installed at any of various positions including the cap plate and the like. In an embodiment, a pair of electrode terminals 150 may be provided for each of the unit cells 100, and the pair of electrode terminals 150 may each be electrically connected to a cathode and an anode of the electrode assembly 110.

The bus bar 200 electrically connects any pair of unit cells 100 among a plurality of unit cells 100 to each other. The pair of unit cells 100 are disposed to be adjacent to each other, and the bus bar 200 may be formed such that the electrode terminals 150 which are each installed at the pair of unit cells 100 are electrically connected to each other.

Although a plurality of unit cells 100 in a battery module according to an example embodiment of the present invention may be arranged along a width direction X of the case 120 as illustrated in FIG. 1, the plurality of unit cells 100 may be arranged in any of various directions.

The bus bar 200 is inserted between a pair of adjacent unit cells 100. FIG. 2 illustrates a cross-section of the pair of unit cells 100 and a bus bar 200 which is inserted between the pair of unit cells 100.

The bus bar 200 includes the terminal coupling unit 220 which is inserted between electrode terminals 150 which are each formed in the pair of unit cells 100, and includes the case coupling unit 240 which is inserted between cases 120 which are formed in the one pair of unit cells 100.

In an embodiment, the bus bar 200 is physically coupled and electrically connected to the electrode terminals 150 of the unit cells 100, and may be formed of a conductive material such that the bus bar 200 electrically connects between the unit cells 100.

As illustrated in FIG. 2, the terminal coupling unit 220 of the bus bar 200 may be formed to be inserted between the electrode terminals 150 provided in the unit cells 100 that are different from each other such that the terminal coupling unit 220 is brought into contact with the electrode terminals 150. The pair of adjacent unit cells 100 may have respective electrode terminals 150 electrically connected to each other by the terminal coupling unit 220.

In an embodiment, the terminal coupling unit 220 may be formed such that the terminal coupling unit 220 is brought into contact with surfaces of the electrode terminals 150 that face each other. Accordingly, the terminal coupling unit 220 can implement an effective electrical connection state while minimizing or reducing its volume without being protruded to the outside of the electrode terminal 150.

A portion of the terminal coupling unit 220 which is brought into contact with the electrode terminal 150 may have any of various shapes according to a shape of the electrode terminal 150. FIGS. 1 to 2 illustrate a bus bar 200 of a form which has a tetragonal cross-section and of which both end portions along a width direction X of the case 120 are brought into contact with the electrode terminal 150 according to an example embodiment of the present invention.

In an embodiment, the case coupling unit 240 may be coupled to or integrally formed with the terminal coupling unit 220, and may be inserted between respective cases 120 of the pair of adjacent unit cells 100. Both surfaces of the case coupling unit 240 along the width direction X of the case 120 may be contacted with and supported by the case 120.

As illustrated in FIGS. 1 and 2, a unit cell 100 may have the electrode terminal 150 formed on a top surface thereof, and the terminal coupling unit 220 may be formed in a longitudinal direction parallel to the width direction X of the case 120 in a battery module according to an example embodiment of the present invention.

The case coupling unit 240 may be formed such that it is protruded in a downward direction from the terminal coupling unit 220, or may have any of various shapes. In an embodiment, the case coupling unit 240 may be formed in a rectangular (e.g., square) pillar shape having a rectangular (e.g., square) cross-section as illustrated in FIG. 2.

The bus bar 200 may be structurally stably coupled between a pair of unit cells 100 by the case coupling unit 240. In an embodiment, the case coupling unit 240 may have an internal space 205 formed therein, or may be formed to have elasticity such that the case coupling unit 240 absorbs an impact or the like transmitted from the outside of the battery module. Further, the case coupling unit 240 may be configured to absorb a thickness change according to swelling occurring in the respective unit cells 100.

In an embodiment, the case 120 may be electrically connected to a cathode or an anode of the electrode assembly 110. The case coupling unit 240 and the terminal coupling unit 220 are formed of a conductive material, and may be provided to electrically connect the adjacent unit cells 100 in a state in which the case coupling unit 240 and the terminal coupling unit 220 are brought into contact with each case 120 of adjacent unit cells 100. Accordingly, the case coupling unit 240 together with the terminal coupling unit 220 can increase an electrical connection area.

The bus bar 200 including the terminal coupling unit 220 and a case coupling unit 240 is inserted between adjacent unit cells 100 such that the bus bar 200 is brought into contact with and electrically connected to the adjacent unit cells 100. Therefore, an additional coupling member is not required in coupling of the bus bar 200.

Therefore, a configuration can be simplified. Further, electrical connectivity can be effectively improved by adding a coupling member such as a bolt or the like, thereby minimizing or reducing a resistance increase in the electrical connection of the bus bar 200 and the unit cells 100.

Each of the unit cells in a battery module according to an example embodiment of the present invention may include the electrode terminal 150 and the case 120 having the same polarity. That is, the electrode terminal 150 together with the case 120 to which the bus bar 200 is coupled may be electrically connected to any one of a cathode and an anode in the electrode assembly 110.

Since the bus bar 200 has a structure in which the terminal coupling unit 220 and the case coupling unit 240 are closely adhered and electrically connected to the electrode terminal 150 and the case 120 of the unit cell 100, the bus bar 200 lowers resistance by effectively increasing an area of the bus bar 200 contacting the unit cell 100, and can effectively improve electrical connection performance thereof.

As illustrated in FIGS. 1 and 2, the plurality of unit cells 100 in a battery module according to an example embodiment of the present invention are arranged along a width direction X of the case 120, the terminal coupling unit 220 is extended along an arrangement direction of the plurality of unit cells 100, both end portions of the terminal coupling unit 220 are brought into contact with each respective electrode terminal 150 of the pair of unit cells 100, the case coupling unit 240 is extended from the terminal coupling unit 220, and both surfaces of the case coupling unit 240 may be brought into contact with each respective case 120 of the pair of unit cells 100.

According to an example embodiment of the present invention, the terminal coupling unit 220 may be formed in a shape that is extended along an arrangement direction of the unit cells 100 as illustrated in FIG. 2, i.e., the width direction X of the case 120. Both end portions of the terminal coupling unit 220 along the width direction X of the case 120 are brought into contact with and electrically connected to respective electrode terminals 150 which face each other.

The case coupling unit 240 may be extended in a downward direction of the terminal coupling unit 220, and both surfaces of the case coupling unit 240 along the width direction X of the case 120 may be brought into contact with the respective cases 120 which face each other.

FIG. 2 illustrates a state in which a bus bar 200 including the terminal coupling unit 220 and the case coupling unit 240 having the above-described shapes is inserted into a pair of unit cells 100.

In an embodiment, as illustrated in FIG. 2, the electrode terminal 150 in a battery module according to an example embodiment of the present invention has an insertion groove 155 formed in surfaces thereof facing the terminal coupling unit 220 such that the terminal coupling unit 220 is inserted into and coupled to the insertion groove 155, a surface of the insertion groove 155 which is at the side of a longitudinal direction Y of the case 120 is open, and the terminal coupling unit 220 is slid along the longitudinal direction Y of the case 120 such that the terminal coupling unit 220 may be inserted into the insertion groove 155.

The electrode terminal 150 in an example embodiment of the present invention may have the insertion groove 155 formed in surfaces thereof which face the terminal coupling unit 220, the insertion groove 155 is formed to be recessed along the width direction X of the case 120, and a surface of the insertion groove 155 along the longitudinal direction Y of the case 120 may be open.

The open surface of the insertion groove 155 may be a surface of the insertion groove 155 facing the center of the case 120, or the opposite surface thereof, and both surfaces of the insertion groove 155 may be open.

The bus bar 200 may be slid and inserted between a pair of adjacent unit cells 100 along the longitudinal direction Y of the case 120. In an embodiment, the bus bar 200 may be formed such that the thickness of the bus bar 200 corresponds to that of the insertion groove 155, and both end portions of the bus bar 200 are inserted into the insertion grooves 155 and brought into contact with the electrode terminals 150 which face each other such that both end portions of the bus bar 200 are electrically connected to the electrode terminals 150.

As illustrated in FIG. 2, the case 120 in a battery module according to an example embodiment of the present invention may have a stepped groove 125 formed in a surface thereof facing the case coupling unit 240 such that the case coupling unit 240 is inserted into the stepped groove 125.

In an embodiment, the case 120 may have the stepped groove 125 formed in a surface thereof facing the case coupling unit 240 of the bus bar 200, the stepped groove 125 is recessed along the width direction X of the case 120, and a surface of the stepped groove 125 along the longitudinal direction Y of the case 120 may be open.

A surface of the stepped groove 125 may be open to be exposed to the outside of the unit cell 100, and the case coupling unit 240 together with the terminal coupling unit 220 may be slid and inserted between respective cases 120 of adjacent unit cells 100 along the longitudinal direction Y of the case 120.

That is, the insertion groove 155 and the stepped groove 125 may have their outer surfaces open along the longitudinal direction Y of the case 120, and the bus bar 200 may be slid along the longitudinal direction Y of the case 120 such that the terminal coupling unit 220 is inserted into the insertion groove 155 and the case coupling unit 240 is inserted into and mounted on the stepped groove 125 at the same time.

Accordingly, in an embodiment, as the stepped groove 125 in addition to the insertion groove 155 is formed, the bus bar 200 may be stably inserted between adjacent unit cells 100 and may maintain a stable contact state between the adjacent unit cells 100.

Figure 3:
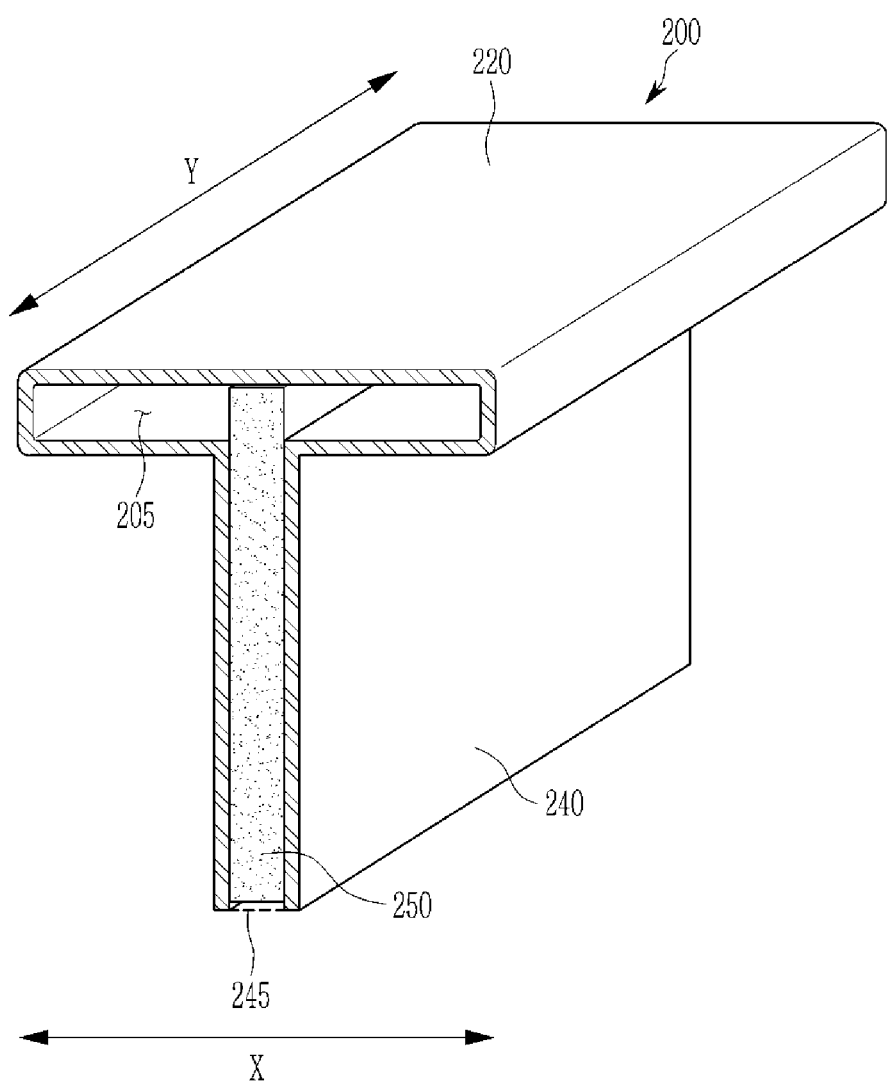
FIG. 3 is a perspective view showing a cross-section of a bus bar of a battery module according to an example embodiment of the present invention.

FIG. 3 shows a perspective view of a bus bar 200 in a battery module according to an example embodiment of the present invention. In an example embodiment of the present invention, the case coupling unit 240 may have an internal space 205 formed therein to absorb a separation distance change of a pair of unit cells 100.

FIGS. 2 and 3 illustrate a case coupling unit 240 in which the internal space 205 is formed according to an example embodiment of the present invention. In an example embodiment of the present invention, the terminal coupling unit 220 and the case coupling unit 240 may have a common internal space 205 formed therein, as illustrated in FIGS. 2 and 3.

The case coupling unit 240, which is inserted to be in surface contact with respective cases 120 of adjacent unit cells 100, may have the internal space 205 formed therein to absorb a thickness change or an external impact, such as due to swelling of the unit cells 100.

A swelling phenomenon of the unit cells 100 may be generated due to any of various reasons in the operation of a battery module. For example, thickness variation of the unit cells 100 may be generated under the swelling circumstances in which volume of the case 120 is expanded by an increase in internal pressure of the unit cell 100.

When swelling of the unit cell 100 is generated in an example embodiment of the present invention, the case coupling unit 240 may have a reduced thickness by forming the internal space 205 in the case coupling unit 240 of a bus bar 200 which is coupled to the unit cell 100 that is expanded by swelling, such that the case coupling unit 240 is compressed as much as a thickness increment of the case 120.

That is, the case coupling unit 240 in an example embodiment of the present invention has the internal space 205 formed therein such that the case coupling unit 240 is formed to have a varied thickness according to an external pressure, thereby effectively coping with or accommodating swelling of the unit cell 100, and further providing a buffer space for absorbing an external impact.

As illustrated in FIG. 3, a bus bar 200 of a battery module according to an example embodiment of the present invention includes the terminal coupling unit 220 and the case coupling unit 240 which may be formed by bending a single conductive member, and both surfaces of the bus bar 200 may be open along the longitudinal direction Y of the case 120.

In an embodiment, the bus bar 200 may be formed by bending a plate-shaped member made of metal several times. That is, in an embodiment, the bus bar 200 is integrally composed of the terminal coupling unit 220 and the case coupling unit 240, and may be formed in the form of a clip by bending a single conductive member several times.

The bus bar 200 which is formed by bending a single member according to an example embodiment of the present invention may be formed with a hollow form having the internal space 205 formed therein, and may be formed such that both surfaces of the bus bar 200 are open along the longitudinal direction Y of the case 120.

The bus bar 200 allows a thickness variation thereof and enables it to be elastically compressed and restored when swelling of the unit cell 100 is generated by forming the bus bar 200 by bending the single member such that the internal space 205 is formed therein. Moreover, since the bus bar 200 has a shape of which both surfaces thereof are open along the longitudinal direction Y of the case 120, compression and restoration of the bus bar 200 according to an external pressure may easily occur.

As illustrated in FIGS. 2 and 3, the case coupling unit 240 in a battery module according to an example embodiment of the present invention is extended from the terminal coupling unit 220, and an end portion 245 of the case coupling unit 240 may be open such that the internal space 205 is exposed to the outside.

In an embodiment, the bus bar 200 illustrated in FIGS. 2 and 3 is formed by protruding the case coupling unit 240 in a downward direction of the terminal coupling unit 220, and the end portion 245 of the case coupling unit 240 has an open shape. The case coupling unit 240 of which the internal space 205 is exposed from the open end portion 245 to the outside has a free end formed in lower end portions of both surfaces thereof that are brought into contact with the case 120.

Therefore, the case coupling unit 240 which may be compressed in the width direction X of the case 120 according to generation of swelling or the like of the unit cell 100 facilitates displacement due to compression by forming the free end in the lower end portions of both surfaces of the case coupling unit 240. Accordingly, a thickness variation of the unit cell 100 due to swelling or the like may effectively occur.

In an embodiment, an insulating member 250 having elasticity is provided in the internal space 205 of the case coupling unit 240, as in the bus bar 200 illustrated in FIGS. 2 and 3. The case coupling unit 240 according to an example embodiment of the present invention has the insulating member 250 having elasticity formed therein. Therefore, the case coupling unit 240 can maintain a state in which both surfaces of the case coupling unit 240 are stably closely adhered to the case 120 of the unit cell 100 by elasticity of the insulating member 250 even when the case coupling unit 240 returns to the normal state after a separation distance between the unit cells 100 is reduced according to the generation of swelling.

The insulating member 250 may be formed of any of various materials, and the insulating member 250 may be provided such that the insulating member 250 is closely adhered to and supported by an inner surface of the case coupling unit 240 in the internal space 205 of the case coupling unit 240. The shape of the insulating member 250 may include a shape which is formed by the internal space 205 of the case coupling unit 240 or any of various shapes.

Although the present invention has been illustrated and described in connection with certain embodiments, it will be apparent to those skilled in the art that the present invention may be variously modified and changed within the technical scope or spirit of the present invention provided by the following claims.

What is claimed is:

1. A battery module comprising:
a plurality of unit cells, each comprising a case and an electrode terminal protruding from the case; and
a bus bar which electrically connects any pair of unit cells among the plurality of unit cells,
wherein the bus bar comprises:
a terminal coupler which is inserted between respective electrode terminals of the pair of unit cells; and
a case coupler which is inserted between respective cases of the pair of unit cells,
wherein the bus bar comprises an insulating member having elasticity in an internal space of the case coupler.

2. The battery module of claim 1, wherein the electrode terminal and the case have a same polarity.

3. The battery module of claim 1, wherein
the unit cells are arranged along a width direction of the cases,
the terminal coupler is extended along an arrangement direction of the plurality of unit cells, and both end portions of the terminal coupler are in contact with respective electrode terminals of the pair of unit cells, and
the case coupler is extended from the terminal coupler, and both surfaces of the case coupler are in contact with respective cases of the pair of unit cells.

4. The battery module of claim 3, wherein
the electrode terminal has an insertion groove in a surface thereof facing the terminal coupler such that the terminal coupler is inserted into and coupled to the insertion groove,
a surface of the insertion groove at a longitudinal directional side of the case is open, and
the terminal coupler is slidable along a longitudinal direction of the case such that the terminal coupler is inserted into the insertion groove.

5. The battery module of claim 4, wherein the case has a stepped groove in a surface thereof facing the case coupler such that the case coupler is inserted into the stepped groove.

6. The battery module of claim 2, wherein the case coupler has the internal space to accommodate a separation distance change of the pair of unit cells.

7. The battery module of claim 6, wherein the terminal coupler and the case coupler are formed by bending a single conductive member, and both surfaces of the bus bar are open along a longitudinal direction of the case.

8. The battery module of claim 7, wherein the case coupler is extended from the terminal coupler, and an end portion of the case coupler is open such that the internal space is exposed to the outside.

* * * * *